(12) United States Patent
Park et al.

(10) Patent No.: US 10,858,749 B2
(45) Date of Patent: Dec. 8, 2020

(54) ELECTROPLATING SOLUTION FOR LITHIUM METAL, AND METHOD FOR MANUFACTURING LITHIUM METAL ELECTRODE BY USING SAME

(71) Applicant: LG CHEM, LTD., Seoul (KR)

(72) Inventors: Changhun Park, Daejeon (KR); Minehul Jang, Daejeon (KR); Da Young Sung, Daejeon (KR); Se Ho Park, Daejeon (KR); Doyeon Kim, Daejeon (KR); Donghyeon Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/337,804

(22) PCT Filed: Apr. 4, 2018

(86) PCT No.: PCT/KR2018/003951
§ 371 (c)(1),
(2) Date: Mar. 28, 2019

(87) PCT Pub. No.: WO2018/190559
PCT Pub. Date: Oct. 18, 2018

(65) Prior Publication Data
US 2019/0226109 A1    Jul. 25, 2019

(30) Foreign Application Priority Data

Apr. 14, 2017 (KR) .................. 10-2017-0048299
Apr. 2, 2018 (KR) .................. 10-2018-0038063

(51) Int. Cl.
*C25D 3/42* (2006.01)
*H01M 4/04* (2006.01)
(Continued)

(52) U.S. Cl.
CPC .................. *C25D 3/42* (2013.01); *C25C 1/02* (2013.01); *C25D 3/56* (2013.01); *H01M 4/04* (2013.01);
(Continued)

(58) Field of Classification Search
CPC .... C25D 3/66; C25D 3/42; C25C 1/02; C25C 3/02
See application file for complete search history.

(56) References Cited

U.S. PATENT DOCUMENTS 8,795,868 B1    8/2014 Miles
2007/0082264 A1    4/2007 Mikhaylik
(Continued)

FOREIGN PATENT DOCUMENTS

JP    2000-282255 A    10/2000
JP    2007-9319 A    1/2007
(Continued)

OTHER PUBLICATIONS

Extended European Search Report for European Application No. 18784957.5, dated Oct. 31, 2019.
(Continued)

*Primary Examiner* — Brian W Cohen
(74) *Attorney, Agent, or Firm* — Birch, Stewart, Kolasch & Birch, LLP

(57) ABSTRACT

An electroplating solution for lithium metal, and a method for preparing a lithium metal electrode using the same, and in particular, while preparing a lithium metal electrode using electroplating, a lithium metal electrode having enhanced surface properties may be prepared by electroplating using a plating solution including a lithium nitrogen oxide and a metal nitrogen oxide, and, by using such a lithium metal electrode in a battery, lifetime properties of the battery may be enhanced.

11 Claims, 3 Drawing Sheets

(51) Int. Cl.
| | | |
|---|---|---|
| *H01M 4/66* | (2006.01) | |
| *H01M 4/70* | (2006.01) | |
| *H01M 4/1395* | (2010.01) | |
| *C25C 1/02* | (2006.01) | |
| *C25D 3/56* | (2006.01) | |
| *H01M 10/0525* | (2010.01) | |

(52) U.S. Cl.
CPC ....... *H01M 4/0404* (2013.01); *H01M 4/0452* (2013.01); *H01M 4/1395* (2013.01); *H01M 4/66* (2013.01); *H01M 4/661* (2013.01); *H01M 4/70* (2013.01); *H01M 10/0525* (2013.01)

(56) References Cited

U.S. PATENT DOCUMENTS

| | | | |
|---|---|---|---|
| 2012/0067737 A1* | 3/2012 | Zhang | H01M 6/52 205/557 |
| 2012/0270114 A1 | 10/2012 | Reynolds et al. | |
| 2013/0199936 A1* | 8/2013 | Zhang | C25D 3/42 205/263 |
| 2013/0327648 A1 | 12/2013 | Grant et al. | |
| 2014/0178770 A1* | 6/2014 | Xu | C25D 3/42 429/331 |
| 2016/0056501 A1 | 2/2016 | Ryu et al. | |
| 2016/0190667 A1 | 6/2016 | Wen et al. | |
| 2016/0254572 A1 | 9/2016 | Yu et al. | |
| 2017/0062829 A1 | 3/2017 | Ryu et al. | |
| 2017/0214106 A1 | 7/2017 | Johnson et al. | |

FOREIGN PATENT DOCUMENTS

| | | |
|---|---|---|
| KR | 10-2001-0024927 A | 3/2001 |
| KR | 10-2002-0088417 A | 11/2002 |
| KR | 10-0447792 B1 | 9/2004 |
| KR | 10-2006-0125853 A | 12/2006 |
| KR | 10-0907804 B1 | 7/2009 |
| KR | 10-2014-0051251 A | 4/2014 |
| KR | 10-1417268 B1 | 7/2014 |
| KR | 10-2014-0106645 A | 9/2014 |
| KR | 10-2014-0127801 A | 11/2014 |
| KR | 10-1602337 B1 | 3/2016 |
| KR | 10-2016-0038735 A | 4/2016 |
| KR | 10-2016-0050222 A | 5/2016 |
| KR | 10-2016-0107506 A | 9/2016 |
| KR | 10-2017-0026098 A | 3/2017 |
| WO | WO 99/43034 A1 | 8/1999 |
| WO | WO 02/061863 A1 | 8/2002 |
| WO | WO 2012/174393 A1 | 12/2012 |
| WO | WO 2013/119273 A1 | 8/2013 |
| WO | WO 2017/127485 A1 | 7/2017 |

OTHER PUBLICATIONS

Sahalie et al., "Effect of bifunctional additive potassium nitrate on performance of anode free lithium metal battery in carbonate electrolyte," Journal of Power Sources, vol. 437, 2019, pp. 1-9.
International Search Report issued in PCT/KR2018/003951 (PCT/ISA/210), dated Aug. 1, 2018.

* cited by examiner

[Figure 1]
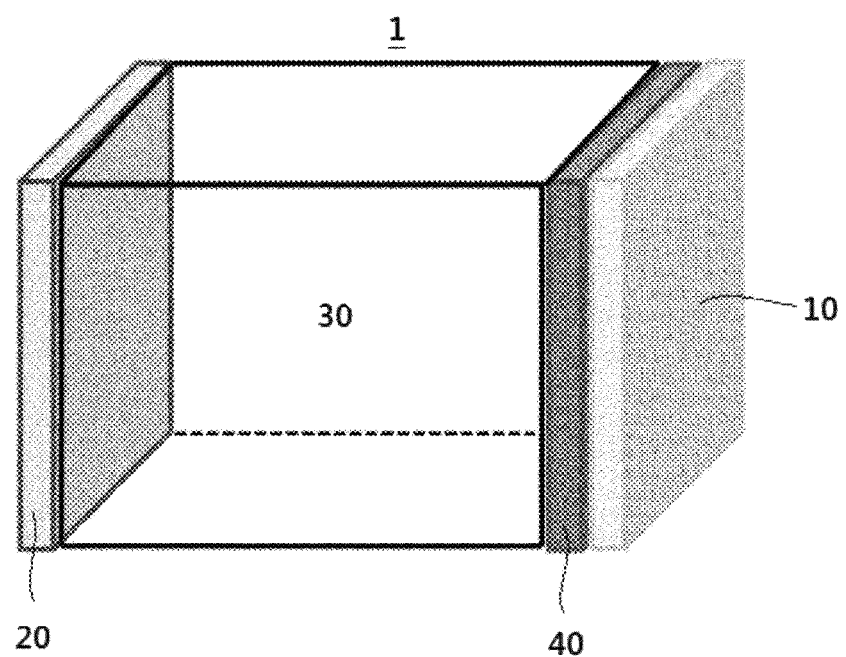

【Figure 2】
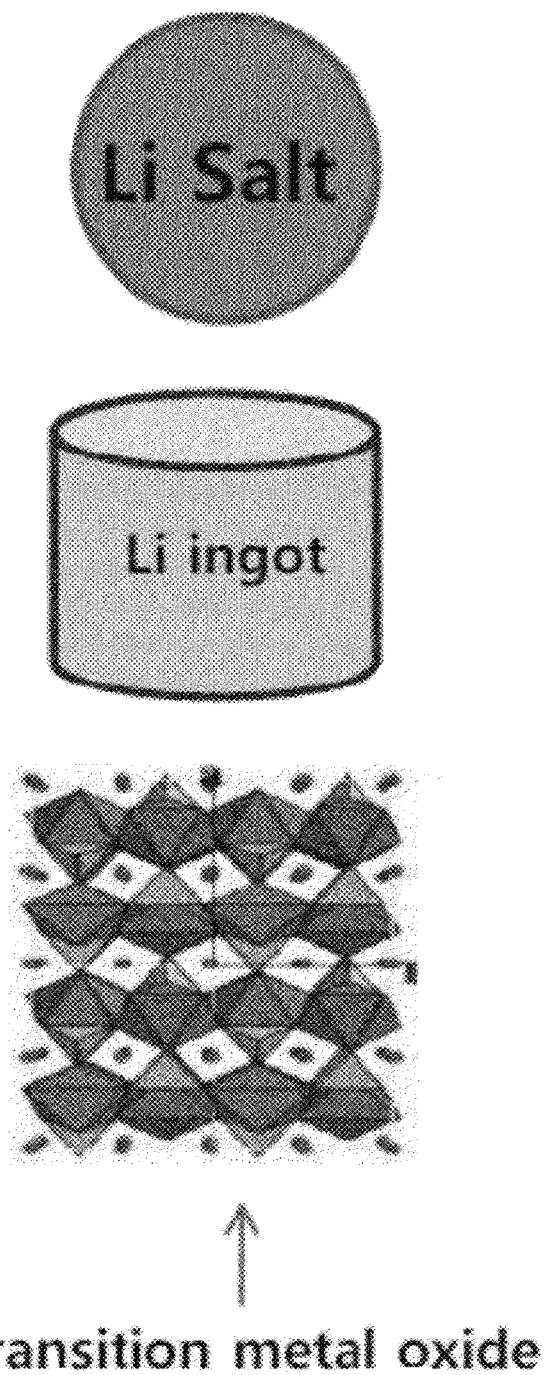

[Figure 3]
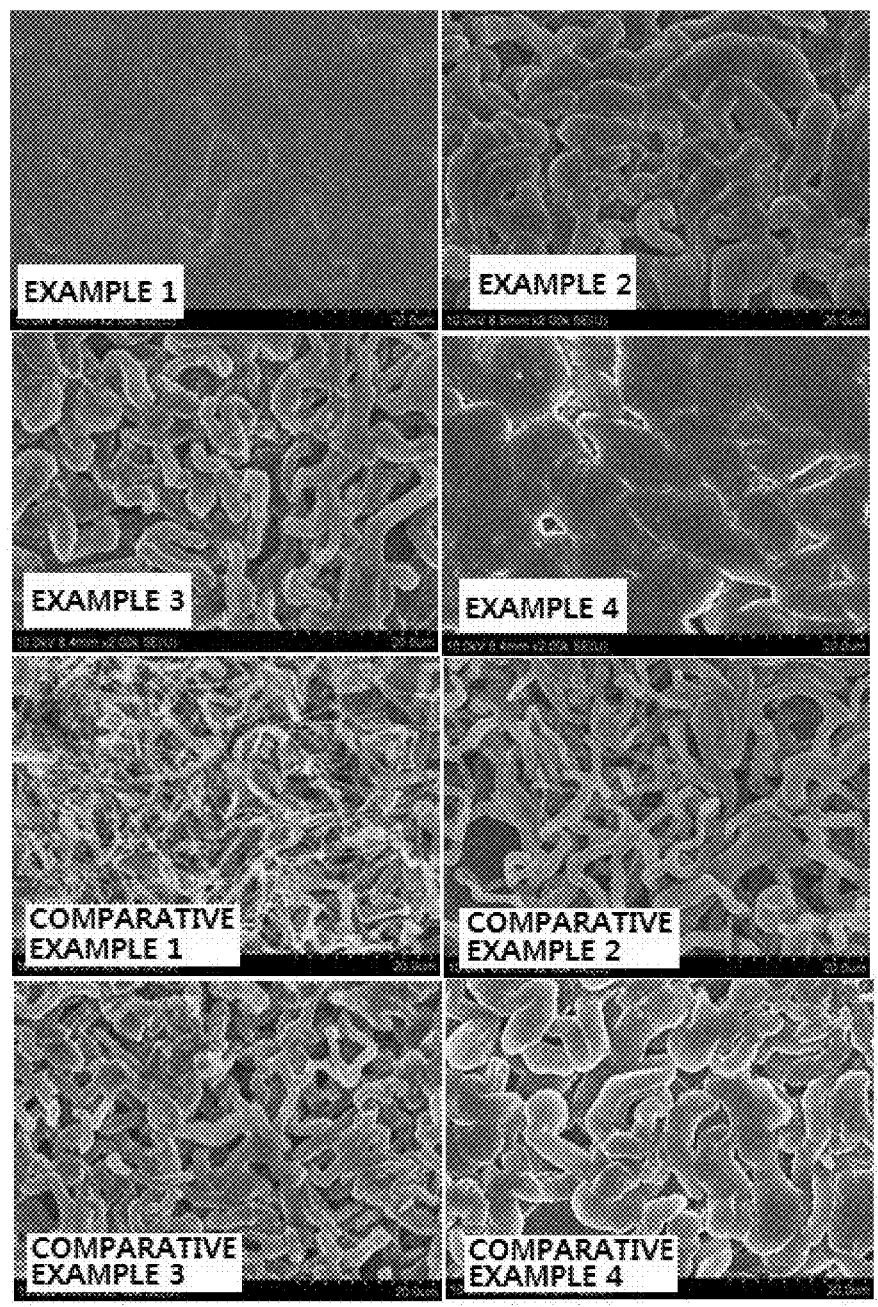

ELECTROPLATING SOLUTION FOR LITHIUM METAL, AND METHOD FOR MANUFACTURING LITHIUM METAL ELECTRODE BY USING SAME

TECHNICAL FIELD

This application claims priority to and the benefits of Korean Patent Application No. 10-2017-0048299, filed with the Korean Intellectual Property Office on Apr. 14, 2017, and Korean Patent Application No. 10-2018-0038063, filed with the Korean Intellectual Property Office on Apr. 2, 2018, the entire contents of which are incorporated herein by reference.

The present invention relates to an electroplating solution for lithium metal and a method for preparing a high capacity lithium metal electrode using the same.

BACKGROUND ART

With recent development of the electronics industry, electronic devices have been able to be smaller and lighter, and the use of portable electronic devices have increased as a result. Needs of secondary batteries having high energy density as a power source of such portable electronic devices have increased, and studies on lithium secondary batteries have been actively progressed.

Typical high capacity batteries among lithium secondary batteries include lithium sulfur batteries, lithium air batteries and the like, and these commonly use lithium metal as a high capacity negative electrode material.

Lithium metal is an ideal material as a negative electrode of a high energy density lithium secondary battery with high theoretical capacity of 3,862 mAh/g, and low standard electrode potential (−3.04 vs SHE). However, commercialization as a negative electrode material of a lithium battery has had a problem due to decreased safety resulted from a battery short circuit caused by lithium dendrite growth, and the like.

In addition, when lithium ions are reduced on a lithium metal surface, a solid electrolyte interphase (SEI) layer is formed by a combination of a solvent of an electrolyte liquid and a salt, which may cause irreversibility.

When the SEI layer is unstable, a direct reaction between an electrolyte liquid and lithium metal consistently occurs causing additional irreversibility, and as a result, a decrease in the charge and discharge efficiency of the lithium metal may be caused. In addition, problems such as depleting the electrolyte liquid due to the consumption of the electrolyte liquid used for SEI layer formation, and decreasing a battery lifetime by gases produced as byproducts may occur.

In view of the above, development of technologies on methods for preparing lithium metal capable of securing safety by controlling a surface shape of the lithium metal has been required when preparing an electrode using lithium metal.

PRIOR ART DOCUMENTS

Korean Patent No. 0447792, "Lithium electrode using porous three-dimensional current collector, method for preparing the same, and lithium battery"

DISCLOSURE

Technical Problem

As a result of extensive studies in view of the above, the inventors of the present invention have, while preparing a lithium metal electrode by electroplating, prepared a lithium metal electrode with its surface properties controlled by changing a composition of a plating solution used for the electroplating, and have identified that the lithium metal electrode prepared using such a method exhibits smooth surface properties and is capable of enhancing lifetime properties of a battery.

Accordingly, an aspect of the present invention provides an electroplating solution for lithium metal capable of preparing a lithium metal electrode.

Another aspect of the present invention provides a method for preparing a high capacity lithium metal electrode.

Technical Solution

According to an aspect of the present invention, there is provided an electroplating solution for lithium metal, the electroplating solution including an ether-based solvent; a lithium salt; a lithium nitrogen oxide; and an additive represented by the following Chemical Formula 1.

$MNO_X$  <Chemical Formula 1>

In Chemical Formula 1, M is Cs, Rb, K, Ba, Sr, Ca, Na or Mg, and x is 2 or 3.

The electroplating solution may use, as a source of lithium metal for electroplating, one or more types selected from the group consisting of a lithium salt, lithium ingot and a transition metal oxide.

The lithium salt may be included in the electroplating solution in a concentration of 1 M to 7 M.

The lithium nitrogen oxide may be included in the electroplating solution in a content of 1% by weight to 5% by weight based upon the total weight of the electroplating solution.

$Li^+$ of the lithium nitrogen oxide and $M^+$ of the additive represented by Chemical Formula 1 may have a concentration ratio ($[Li^+]/[M^+]$) of 10 or greater.

The ether-based solvent may be one or more types selected from the group consisting of tetrahydrofuran, 2-methyltetrahydrofuran, dimethyl ether and dibutyl ether.

The lithium salt may be one or more types selected from the group consisting of one or more selected from the group consisting of LiFSI, $LiPF_6$, LiCl, LiBr, LiI, $LiClO_4$, $LiBF_4$, $LiB_{10}Cl_{10}$, $LiCF_3SO_3$, $LiCF_3CO_2$, $LiAsF_6$, $LiSbF_6$, $LiPF_6$, $LiAlCl_4$, $CH_3SO_3Li$, $CF_3SO_3Li$, $(CF_3SO_2)_2NLi$, chloroborane lithium and lithium tetraphenylborate.

The lithium nitrogen oxide may be one or more types selected from the group consisting of lithium nitrate ($LiNO_3$) and lithium nitrite ($LiNO_2$).

The additive may be one or more types selected from the group consisting of potassium nitrate ($KNO_3$), cesium nitrate ($CsNO_3$), magnesium nitrate ($MgNO_3$), barium nitrate ($BaNO_3$), potassium nitrite ($KNO_2$) and cesium nitrite ($CsNO_2$).

The lithium nitrogen oxide and the additive may be lithium nitrate ($LiNO_3$) and cesium nitrate ($CsNO_3$), respectively.

According to another aspect of the present invention, there is provided a method for preparing a lithium metal electrode using electroplating, including electroplating lithium metal on a current collector using the electroplating solution.

The method for preparing a lithium metal electrode comprises (a) immersing a source of lithium metal and a current collector to electroplate the lithium metal into the electroplating solution; and (b) electroplating the lithium metal on the current collector by applying reduction potential to the electroplating solution.

The source of lithium metal may be one or more types selected from the group consisting of a lithium salt, lithium ingot and a transition metal oxide.

The current collector may be selected from the group consisting of Cu, Al, Ni, Fe, steel use stainless (SUS) and Ti, and may have a three-dimensional structure form.

Advantageous Effects

An electroplating solution for lithium metal according to the present invention is used for electroplating lithium metal, and, among electroplating, is used for an electroplating process using one or more types selected from the group consisting of a lithium salt, lithium ingot and a transition metal oxide as a lithium metal source, and as a result, surface properties of a prepared lithium metal electrode can be controlled depending on a composition of the electroplating solution.

In addition, when progressing the electroplating process using a electroplating solution comprising lithium nitrate ($LiNO_3$) and cesium nitrate ($CsNO_3$) in certain concentrations and the lithium metal source for the electroplating, a lithium metal electrode having smooth surface properties and a thin film form can be prepared.

In addition, a lithium metal electrode having a thickness level of 20 μm or less, which has not been able to accomplish using existing rolling methods, can be prepared.

In addition, a lithium metal electrode can be prepared using current collectors that have been difficult to use in existing rolling methods, for example, various current collectors such as Cu, Al, Ni, Fe, SUS and Ti.

DESCRIPTION OF DRAWINGS

FIG. 1 is a mimetic diagram of a lithium half-cell capable of carrying out electroplating according to one embodiment of the present invention.

FIG. 2 is a mimetic diagram illustrating a lithium source according to one embodiment of the present invention.

FIG. 3 shows scanning electron microscope (SEM) images of surfaces of lithium metal electrodes each prepared in Examples 1 to 4 and Comparative Examples 1 to 4.

BEST MODE

Hereinafter, the present invention will be described in more detail in order to illuminate the present invention.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Electroplating Solution for Lithium Metal

The present invention relates to an electroplating solution for lithium metal, which comprises an ether-based solvent; a lithium salt; a lithium nitrogen oxide; and an additive represented by the following Chemical Formula 1.

              <Chemical Formula 1>

In Chemical Formula 1, M is Cs, Rb, K, Ba, Sr, Ca, Na or Mg, and x is 2 or 3.

The electroplating solution of the present invention is used for electroplating lithium metal, and particularly, may be used for, among electroplating, electroplating using one or more types selected from the group consisting of a lithium salt (Li Salt), lithium ingot (Li ingot) and a transition metal oxide as a lithium metal source, but is not limited thereto as long as it is a compound capable of providing lithium ions (FIG. 2).

In the present invention, the lithium salt may be one or more types selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F9SO_3$, $LiN(C_2F_5SO_3)_2$, $LiN(C_2F_5SO_2)_2$, $LiN(CF_3SO_2)$ $LiN(CaF_{2a+1}SO_2)$ $(CbF_{2b+1}SO_2)$ (herein, a and b are natural numbers, and preferably $1 \le a \le 20$ and $1 \le b \le 20$), LiCl, LiI and $LiB(C_2O_4)_2$.

The transition metal oxide may be one or more types selected from the group consisting of $LiM'O_2$ (M' is Co, Ni or Mn), $Li_{1+1}Mn_{2-x}O_4^+$ ($0 \le x \le 0.3$) and $LiNi_{1-x}M_xO_2$ (M is Co, Mn, Al, Cu, Fe, Mg, B or Ga, and $0.01 \le x \le 0.3$). For example, the lithium metal oxide may be $LiCoO_2$, $LiNiO_2$, $LiMn_2O_4$, $Li(Ni_aMn_bCo_c)O_2$ (a+b+c=1), $LiNi_{0.5}Mn_{1.5}O_4$ or $LiNi_{0.5}Mn_{0.5}O_2$.

In the present invention, the ether-based solvent is a non-aqueous solvent for forming the ether-based plating solution, and may be one or more types selected from the group consisting of tetrahydrofuran (THF), 2-methyltetrahydrofuran (MTHF), dimethyl ether (DME) and dibutyl ether (DBE). Particularly, using dimethyl ether (DME) may be advantageous in electroplating lithium metal on a current collector.

In the present invention, the lithium salt may be one or more types selected from the group consisting of one or more selected from the group consisting of LiFSI, $LiPF_6$, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiPF_6$, $LiAlCl_4$, $CH_3SO_3Li$, $CF_3SO_3Li$, $(CF_3SO_2)_2NLi$, chloroborane lithium and lithium tetraphenylborate, and particularly, using LiFSI may be advantageous in electroplating lithium metal on a current collector.

In addition, the concentration of the lithium salt may be properly controlled depending on a composition of the electroplating solution, and for example, may be from 1.0 M to 7.0 M and preferably from 1 M to 4 M. When the lithium salt is in less than 1.0 M, conductivity of the electroplating solution is not favorable, and full high-rate discharge properties and lifetime properties may decline, and when the concentration is greater than 7.0 M, low-temperature discharge properties and high-rate discharge properties are not favorable, and usage properties as an actual plating solution may decline.

In the present invention, the electroplating solution may form a stable film on a lithium metal electrode by the lithium nitrogen oxide and the additive represented by Chemical Formula 1 having N—O bonds in the molecules, and accordingly, stability of the lithium metal electrode and the electroplating solution is more improved as side reactions between the lithium metal and the electroplating solution are suppressed, and as a result, a battery lifetime may be greatly enhanced.

For example, the lithium nitrogen oxide may be one or more types selected from the group consisting of lithium nitrate ($LiNO_3$) and lithium nitrite ($LiNO_2$), and the additive may be one or more types selected from the group consisting of potassium nitrate ($KNO_3$), cesium nitrate ($CsNO_3$), magnesium nitrate ($MgNO_3$), barium nitrate ($BaNO_3$), potassium nitrite ($KNO_2$) and cesium nitrite ($CsNO_2$).

The content of the lithium nitrogen oxide included may be from 1% by weight to 5% by weight based on the total weight of the electroplating solution. When the lithium nitrogen oxide content is less than 1% by weight, a product ($Li_xNO_y$) amount is excessively small leading to a problem of insufficient thickness as a protective layer, and when the content is greater than 5% by weight, lithium, an active material, is excessively consumed when producing a protective layer leading to a problem of efficiency decline and the like.

In the electroplating solution, the amounts of the lithium nitrogen oxide and the additive represented by Chemical Formula 1 used may be defined by a concentration ratio of the lithium nitrogen oxide-derived $Li^+$ and the additive represented by Chemical Formula 1-derived $M^+$ ($[Li^+]/[M^+]$).

The concentration ratio ($[Li^+]/[M^+]$) may be 10 or greater. When the concentration ratio is less than the above-mentioned range, M+ is not present in an ionic state and is reduced, which makes surface smoothness difficult due to an insignificant lithium dendrite suppression effect. The concentration ratio ($[Li^+]/[M^+]$) is preferably from 10 to 40.

Particularly, the electroplating solution comprising lithium nitrate ($LiNO_3$) and cesium nitrate ($CsNO_3$) as the lithium nitrogen oxide and the additive, respectively, may be advantageous in smoothing the lithium metal electrode surface.

When comprising cesium nitrate ($CsNO_3$) as the additive, the concentration thereof in the electroplating solution may be 0.1 M or less per 1 M $Li^+$. For example, reduction potential of the $Cs^+$ ions varies depending on the concentration, and when the $Cs^+$ concentration calculated by the Nernst equation is greater than 0.1 M per 1 M $Li^+$, the $Cs^+$ ions have higher reduction potential than the $Li^+$ ions and are reduced before the $Li^+$ ions. The $Cs^+$ needs to be present in an ionic state to perform a role of suppressing dendrite as a leveler, and therefore, the $Cs^+$ concentration may be 0.1 M or less per 1 M $Li^+$ ions, and preferably, the $Cs^+$ concentration may be from 0.03 M to 0.07 M per 1 M $Li^+$.

Method for Preparing Lithium Metal Electrode

The present invention also relates to a method for preparing a lithium metal electrode using electroplating, and relates to a method for preparing a lithium metal electrode having a surface of the prepared lithium metal electrode controlled depending on a concentration of a plating solution used for the electroplating.

According to one embodiment of the present invention, electroplating may be carried out using a lithium half-cell.

FIG. 1 is a mimetic diagram of a half-cell (1) capable of carrying out electroplating according to one embodiment of the present invention.

When referring to FIG. 1, a lithium metal electrode may be prepared using a Cu current collector (10) as a negative electrode, a lithium metal source (20) as a positive electrode, and an ether-based plating solution (30), and by electroplating lithium metal (40) on the Cu current collector (10).

Herein, a specific condition of the electroplating may use a current with a C-rate of 0.01 C to 0.5 C and current density of 0.1 $mAh/cm^2$ to 5 $mAh/cm^2$. When the electroplating condition is outside such a condition, surface properties of a lithium metal electrode formed when electroplating lithium metal may decline. In other words, problems such that the lithium metal electrode surface is not smoothly electroplated, or the electroplated thickness becomes thick may occur.

The ether-based plating solution (30) is the same as the electroplating solution for lithium metal described above.

The lithium metal source (20) is also the same as described above.

In the present invention, the current collector capable of electroplating lithium metal may be selected from the group consisting of Cu, Al, Ni, Fe, steel use stainless (SUS) and Ti, and the current collector may have a three-dimensional structure form.

Such a current collector has not been able to be used in existing rolling processes used for lithium metal, and has an advantage of using more diverse current collectors obtained by electroplating using an ether-based plating solution.

A lithium metal electrode prepared using the electroplating method as described above may have a smoother surface due to reduced surface roughness. When using a lithium metal electrode having a smooth surface, battery driving safety may be enhanced by preventing lithium growth occurring during charge and discharge growing in a needle shape, a cause of internal short circuit.

In addition, the thickness of the plated lithium metal is readily controlled by directly electroplating lithium metal on the current collector. Accordingly, the lithium metal may be electroplated to a small thickness that has not been able to be prepared using existing rolling processes, and as a result, a lithium metal electrode having a thickness of 20 μm or less, a smallest thickness produced by rolling, may be prepared.

In addition, the shape of lithium dendrite formed on the lithium metal electrode surface may also be controlled depending on a composition of the ether-based plating solution used for electroplating. When the lithium dendrite has a needle shape, the lithium dendrite readily falls off from an electrode losing electrical conductivity, which increases the possibility of becoming dead lithium causing a decrease in the efficiency. In addition, a needle shape penetrates a separator and causes a short-circuit, which may cause problems such as a fire due to excessive heat.

As above, by controlling surface properties of the lithium metal electrode such as roughness, the degree of smoothness, a thickness or lithium dendrite shape through varying a composition of the ether-based plating solution, lifetime properties of a battery using the lithium metal electrode may be enhanced.

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also belong to the scope of the attached claims.

In the following Examples 1 to 4 and Comparative Examples 1 to 4, lithium metal was plated on a Cu current collector by electroplating, wherein a composition of a plating solution used for the electroplating varied as described in the following Table 1 when preparing a lithium metal electrode.

TABLE 1

| | Plating Solution | | | | |
|---|---|---|---|---|---|
| | Solvent | Lithium Salt | Lithium Nitrogen Oxide | Additive | Concentration Ratio[note 1] ($[Li^+]/[M^+]$) |
| Example 1 | DME | LiFSI (3M) | $LiNO_3$ (2% by | $CsNO_3$ (0.15M) | 20 |

TABLE 1-continued

| | Plating Solution | | | |
|---|---|---|---|---|
| | Solvent | Lithium Salt | Lithium Nitrogen Oxide | Additive | Concentration Ratio[note1] ($[Li^+]/[M^+]$) |
| Example 2 | DME | LiFSI (1M) | LiNO$_3$ (2% by weight) | CsNO$_3$ (0.15M) | 20 |
| Example 3 | DME | LiFSI (3M) | LiNO$_3$ (2% by weight) | CsNO$_3$ (0.05M) | 60 |
| Example 4 | DME | LiFSI (3M) | LiNO$_3$ (2% by weight) | CsNO$_3$ (0.3M) | 10 |
| Comparative Example 1 | EC:DEC:DMC | LiPF$_6$ (1M) | — | VC (2% by weight) | — |
| Comparative Example 2 | DME | LiFSI (1M) | LiNO$_3$ (2% by weight) | — | — |
| Comparative Example 3 | DME | LiFSI (3M) | LiNO$_3$ (2% by weight) | — | — |
| Comparative Example 4 | DME | LiFSI (3M) | — | CsNO$_3$ (0.15M) | — |

[note1]Concentration ratio ($[Li^+]/[M^+]$) means a concentration ratio of $Li^+$ of the lithium nitrogen oxide and $Cs^+$ of the additive Example 1

A lithium metal electrode was prepared by plating lithium metal on a Cu current collector through electroplating.

Herein, as for the electroplating solution, a plating solution prepared by dissolving LiFSI, a lithium salt, in dimethyl ether (DME), an ether-based solvent, in 3 M, adding LiNO$_3$, a lithium nitrogen oxide, in 2% by weight based on the total plating solution weight, and employing the LiNO$_3$-derived Li$^+$ and CsNO$_3$-derived Cs$^+$, an additive, to have a concentration ratio ($[Li^+]/[Cs^+]$) of 20 was used (Table 1).

In addition, electroplating was carried out using a lithium half-cell employing the Cu current collector as a negative electrode, and including a positive electrode including LiCoO$_2$ as a lithium source, a polyethylene separator provided between the positive electrode and the negative electrode, and the electroplating solution, through flowing a current with a C-rate of 0.2 C (0.95 mA) and current density of 3 mA/cm$^2$.

Example 2

A lithium metal electrode was prepared in the same manner as in Example 1, except that electroplating was carried out by dissolving LiFSI, the lithium salt, in 1 M.

Example 3

A lithium electrode was prepared in the same manner as in Example 1, except that a plating solution prepared so that the LiNO$_3$-derived Li$^+$ and the CsNO$_3$-derived Cs$^+$, the additive, had a concentration ratio ($[Li^+]/[Cs^+]$) of 60 was used.

Example 4

A lithium electrode was prepared in the same manner as in Example 1, except that a plating solution prepared so that the LiNO$_3$-derived Li$^+$ and the CsNO$_3$-derived Cs$^+$, the additive, had a concentration ratio ($[Li^+]/[Cs^+]$) of 10 was used.

Comparative Example 1

A lithium metal electrode was prepared in the same manner as in Example 1 except that, as for the electroplating solution, a plating solution prepared by, as described in Table 1, dissolving LiPF6, a lithium salt, in EC:DEC:DMC (25:50:25 v/v), a carbonate-based solvent, in 1 M, and then dissolving vinylene carbonate (VC) in 2% by weight based on the total plating solution weight was used. Herein, EC is ethylene carbonate, DEC is diethylene carbonate and DMC is dimethylene carbonate.

Comparative Example 2

A lithium metal electrode was prepared in the same manner as in Example 1 except that, as for the electroplating solution, a plating solution prepared by, as described in Table 1, dissolving LiFSI, a lithium salt, in dimethyl ether (DME), an ether-based solvent, in 1 M, and adding LiNO$_3$, a lithium nitrogen oxide, in 2% by weight without using the additive was used.

Comparative Example 3

A lithium metal electrode was prepared in the same manner as in Example 1 except that, as for the electroplating solution, a plating solution prepared by, as described in Table 1, dissolving LiFSI, a lithium salt, in dimethyl ether (DME), an ether-based solvent, in 2 M, and adding LiNO$_3$, a lithium nitrogen oxide, in 2% by weight without using the additive was used.

Comparative Example 4

A lithium metal electrode was prepared in the same manner as in Example 1 except that, as for the electroplating solution, a plating solution prepared by, as described in Table 1, dissolving LiFSI, a lithium salt, in dimethyl ether (DME), an ether-based solvent, in 3 M, and adding CsNO$_3$, an additive, in 0.15 M without using LiNO$_3$, a lithium nitrogen oxide, was used.

Experimental Example 1: Comparison of Surface Properties of Lithium Metal Electrodes Surface properties of the lithium metal electrodes each prepared in Examples 1 to 4 and Comparative Examples 1 to 4 were observed.

FIG. 3 shows scanning electron microscope (SEM) images of surfaces of the lithium metal electrodes each prepared in Examples 1 to 4 and Comparative Examples 1 to 4.

When referring to FIG. 3, it was seen that the surface of the lithium metal electrode prepared in Example 1 was relatively smoothly formed compared to the surfaces of the lithium metal electrodes prepared in Comparative Examples 1 to 4.

From this, it was seen that surface properties of the lithium metal electrode electroplated using the electroplating solution comprising both LiNO$_3$ and CsNO$_3$.

In addition, when referring to Examples 1 to 4, it was seen that, even when using a plating solution comprising both LiNO$_3$ and CsNO$_3$, surface properties of the lithium metal electrode varied depending on the concentration ratio ($[Li^+]/[Cs^+]$) of the $LiNO_3$-derived $Li^+$ and $CsNO_3$-derived $Cs^+$, an additive.

For example, it was seen that surface properties of the lithium metal electrode somewhat declined when the concentration ratio ($[Li^+]/[Cs^+]$) was relatively high as in Example 3.

In addition, among Comparative Examples 1 to 4, Comparative Example 1 using a carbonate-based solvent had a least favorable degree of surface smoothness, and lithium dendrite was observed in a needle shape.

When lithium dendrite has a needle shape, the lithium dendrite readily falls off from an electrode losing electrical conductivity, which increases possibility of being dead lithium causing a decrease in the efficiency. In addition, a needle-shaped lithium dendrite penetrates a separator and causes a short-circuit, which may cause problems such as fires due to excessive heat. Accordingly, when dendrite smoothly grows, possibility of the dendrite falling off from an electrode and losing functions as an active material is reduced increasing lithium metal efficiency, and safety may be greatly enhanced by preventing a short-circuit occurring when destroying a separator.

Hereinbefore, the present invention has been described with reference to limited embodiments and drawings, however, the present invention is not limited thereto, and various modifications and changes may be made by those skilled in the art within technological ideas and the range of equivalents of the attached claims of the present invention.

REFERENCE NUMERAL

1: Lithium Half-Cell
10: Current Collector
20: Lithium Source
30: Ether-Based Plating Solution
40: Lithium Metal

The invention claimed is:

1. A method for preparing a lithium metal electrode by electroplating, the method comprising:
   providing a cathode;
   providing an anode selected from the group consisting of a lithium ingot and a lithium transition metal oxide;
   providing an electroplating solution between the anode and the cathode, wherein the electroplating solution comprises:
   an ether-based solvent;
   a lithium salt;
   a lithium nitrogen oxide; and
   an additive represented by the following Chemical Formula 1:

$MNO_x$ <Chemical Formula 1> wherein, in Chemical Formula 1, M is Cs, Rb, K, Ba, Sr, Ca, Na or Mg, and x is 2 or 3; and
   applying a current between the anode and the cathode to electroplate lithium onto the cathode and provide an additional source of lithium ions into the electroplating solution from the anode.

2. The method of claim 1, wherein a concentration of the lithium salt in the electroplating solution is 1 M to 7 M.

3. The method of claim 1, wherein a content of the lithium nitrogen oxide in the electroplating solution is 1% by weight to 5% by weight based upon a total weight of the electroplating solution.

4. The method of claim 1, wherein $Li^+$ of the lithium nitrogen oxide and $M^+$ of the additive represented by Chemical Formula 1 have a concentration ratio ($[Li^+]/[M^+]$) of between 10 to 40.

5. The method of claim 1, wherein the ether-based solvent is one or more types selected from the group consisting of tetrahydrofuran, 2-methyltetrahydrofuran, dimethyl ether and dibutyl ether.

6. The method of claim 1, wherein the lithium salt is one or more types selected from the group consisting of LiFSi, $LiPF_6$, LiCl, LiBr, LiI, $LiClO_4$, $LiBF_4$, $LiB_{10}Cl_{10}$, $LiCF_3SO_3$, $LiCF_3CO_2$, $LiAsF_6$, $LiSbF_6$, $LiPF_6$, $LiAlCl_4$, $CH_3SO_3Li$, $CF_3SO_3Li$, $(CF_3SO_2)_2NLi$, chloroborane lithium and lithium tetraphenylborate.

7. The method of claim 1, wherein the lithium nitrogen oxide is one or more types selected from the group consisting of lithium nitrate ($LiNO_3$) and lithium nitrite ($LiNO_2$).

8. The method of claim 1, wherein the additive is one or more types selected from the group consisting of potassium nitrate (KNOB), cesium nitrate ($CsNO_3$), magnesium nitrate ($MgNO_3$), barium nitrate ($BaNO_3$), potassium nitrite ($KNO_2$) and cesium nitrite ($CsNO_2$).

9. The method of claim 1, wherein the lithium nitrogen oxide and the additive are lithium nitrate ($LiNO_3$) and cesium nitrate ($CsNO_3$), respectively.

10. The method of claim 1, wherein the cathode is a current collector selected from the group consisting of Cu, Al, Ni, Fe, stainless steel and Ti.

11. The method of claim 1, wherein the cathode has a three-dimensional structure form.

* * * * *